United States Patent [19]
Maroschak

[11] 3,825,288
[45] July 23, 1974

[54] FITTING FOR CORRUGATED PLASTIC PIPE

[76] Inventor: Ernest J. Maroschak, Box 878, Roseboro, N.C. 28382

[22] Filed: Nov. 29, 1972

[21] Appl. No.: 310,480

[52] U.S. Cl............ 285/156, 285/423, 285/DIG. 4, 285/DIG. 22
[51] Int. Cl............................................. F16l 41/00
[58] Field of Search. 285/156, 423, DIG. 4, DIG.22; 138/121; 61/10, 12

[56] References Cited
UNITED STATES PATENTS

| 137,525 | 4/1873 | Bancroft | 285/183 |
|---|---|---|---|
| 3,234,969 | 2/1966 | DuMont | 138/121 |
| 3,695,643 | 10/1972 | Schmunk | 285/423 |

FOREIGN PATENTS OR APPLICATIONS

| 2,012,424 | 10/1971 | Germany | 138/121 |

Primary Examiner—Dave W. Arola
Attorney, Agent, or Firm—Parrott, Bell, Seltzer, Park & Gibson

[57] ABSTRACT

A plastic fitting for corrugated plastic drainage or irrigation pipe. The fitting comprises a corrugated tubular body portion and couplings integrally formed with the body portion at the ends thereof, each coupling including a relatively thin-walled flexible annular sleeve adapted for receiving an end of a length of corrugated plastic pipe therein and also including a plurality of wedge-shaped latching members integrally formed on the sleeve and having a relatively rigid camming surface facilitating insertion of an end of a corrugated pipe in the sleeve. The thin-walled sleeves are extremely flexible and permit independent movement of the latching members relative to each other when the sleeve is flexed during insertion of a pipe in the sleeve. The fitting is capable of receiving and connecting corrugated plastic pipes even though they vary somewhat in external diameter.

7 Claims, 9 Drawing Figures

3,825,288

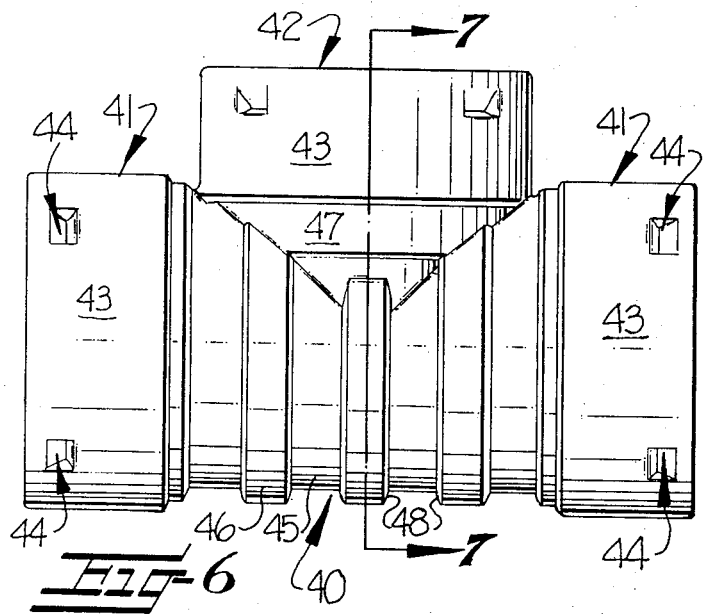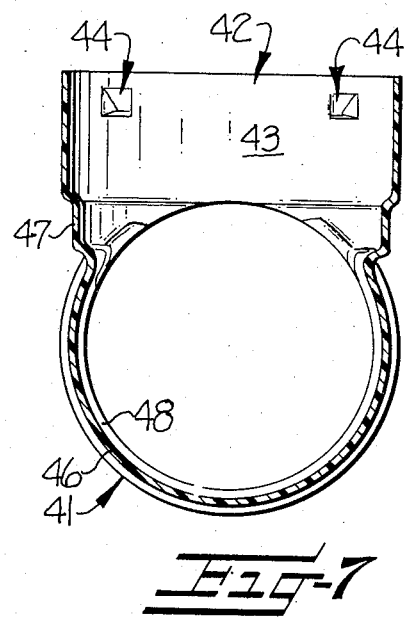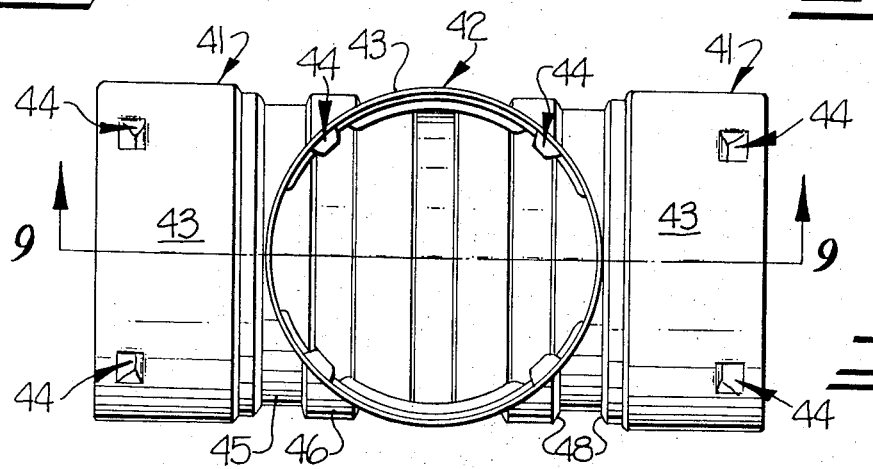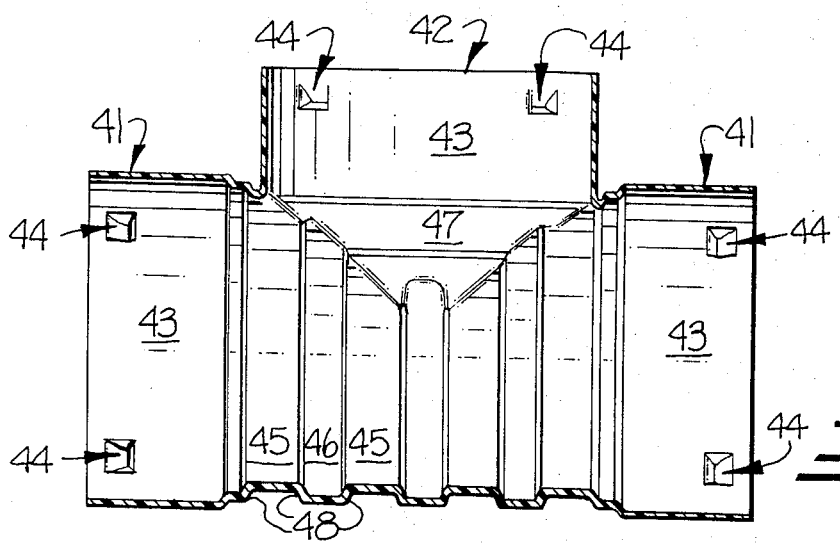

FITTING FOR CORRUGATED PLASTIC PIPE

This invention relates to an improved plastic fitting for corrugated plastic drainage or irrigation pipe.

Corrugated plastic pipe has been used to an increasing extent for drainage and irrigation purposes. This invention is directed to a fitting adapted to be used with corrugated plastic drainage or irrigation pipe for connecting adjoining lengths of the pipe. The fitting provides an effective means of connecting adjoining lengths by a simple manual operation without the need for additional parts or special tools. The fitting also allows a wide tolerance for variations in the exact sizes of the pipes to be used therewith. Corrugated plastic pipes are produced by a number of manufacturers in fairly overall sizes, but the pipes produced by different manufacturers vary somewhat in the exact outside diameter, corrugation size, and other physical dimensions. This invention has the particular advantage of being readily usable with pipes produced by various manufacturers, even though such pipes vary somewhat in physical dimensions.

It is an object of this invention to provide an improved plastic pipe fitting which permits manual connection of a length of corrugated pipe thereto, and which may be used with corrugated plastic pipes which may vary somewhat in external diameter.

More specifically, it is an object of this invention to provide a plastic pipe fitting which permits the manual connection of corrugated plastic pipes thereto even though the pipes vary somewhat in external diameter, wherein the fitting includes a tubular corrugated body and couplings defining the ends of the body which include flexible thin-walled sleeves with wedge-shaped latching members integrally formed thereon and including a relatively rigid camming surface, the latching members being adapted for releasably connecting the pipes to the fitting.

Some of the objects and advantages of the invention having been stated, others will appear as the description proceeds, when taken in connection with the accompanying drawings, in which:

FIG. 6 is an elevation view showing a plastic tee fitting according to a second embodiment of the invention;

FIG. 7 is a sectional view of the plastic tee fitting taken along line 7—7 in FIG. 6;

FIG. 8 is an elevation view of the plastic tee fitting of FIG. 6, looking into the branch opening thereof; and FIG. 9 is a sectional view of the tee fitting taken along line 9—9 in FIG. 8.

Figure 1:
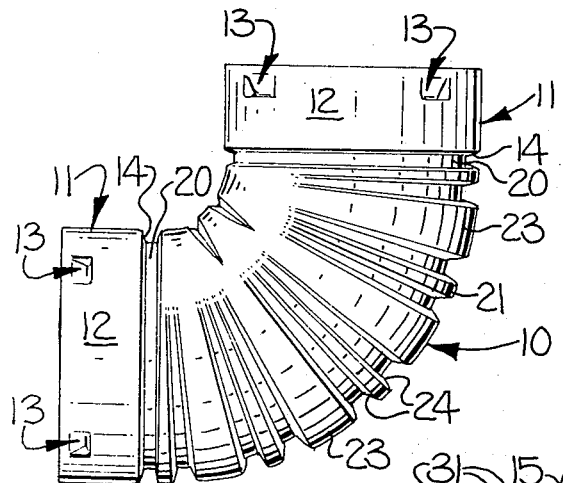
FIG. 1 is an elevation view showing the side of a plastic elbow fitting according to the invention.

FIG. 1 illustrates a first embodiment of the invention wherein the pipe fitting is an elbow and includes a tubular body portion 10 having corrugated walls and couplings 11 integrally formed with body portion 10 and defining the ends of the fitting to which corrugated plastic pipes are to be connected. The couplings 11 each include a flexible annular sleeve 12 having integrally formed thereon a plurality of spaced latching members 13 extending radially inwardly around the interior of the sleeve.

Sleeve 12 is of a substantially uniform inside diameter along the entire axial length thereof which diameter is greater than the outside diameter of the corrugated plastic pipes to be used therewith, and is adapted to receive therein an end portion of a corrugated plastic pipe. The inside end of the sleeve is defined by a stop wall 14 which extends generally radially inwardly from the sleeve and serves to limit the extent to which a pipe may be inserted into the fitting. Stop wall 14 is, in essence, the side wall of the first corrugation at each end of body portion 10.

Figure 2:
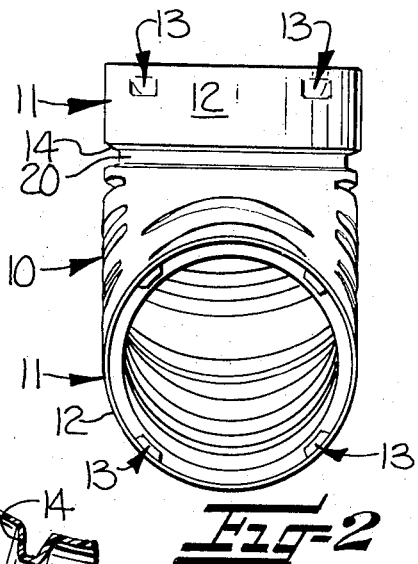
FIG. 2 is an end view of the plastic elbow fitting of FIG. 1, looking into one of the open ends thereof.

The latching members 13 are molded integrally with sleeve 12 and, as shown in FIG. 2, project radially inwardly from the inside of the sleeve. Latching members 13 are arcuately spaced substantially equally apart around the inner circumference of the sleeve and are also spaced axially inwardly from the open end of the sleeve a substantially equal distance which is less than half of the length of the sleeve. Preferably, four latching members are employed, and are arranged in opposing pairs spaced about 90° apart.

Figure 5:
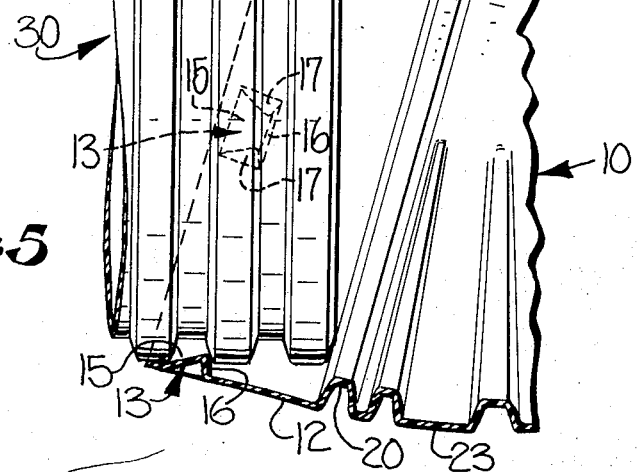
FIG. 5 is a detailed view showing in section a part of one end of a fitting according to the invention with the end of a length of corrugated plastic pipe being attached thereto.
Figure 4:
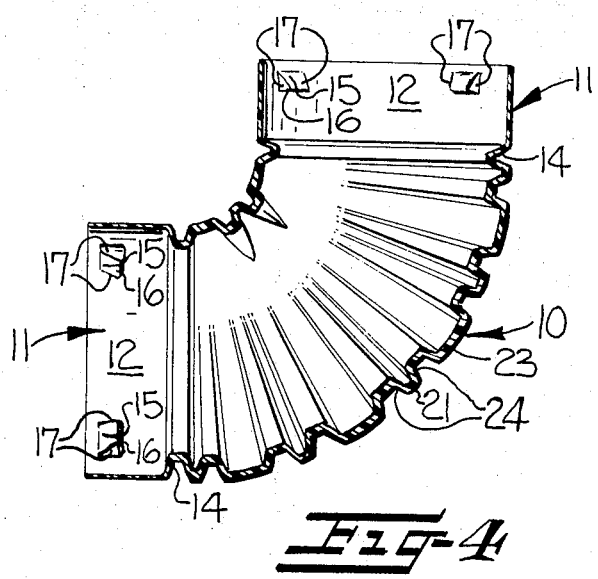
FIG. 4 is a sectional view of the plastic elbow fitting of FIG. 1.

As shown in detailed section in FIG. 5, each latching member 13 is in the form of an inclined wedge of substantially hollow construction having a relatively rigid camming surface 15 which facilitates insertion of the pipe into the sleeve by permitting the ribs 31 of the corrugated plastic pipe 30 to slide thereover. The wedge-shaped latching members also include an inwardly projecting shoulder surface 16 which extends nearly perpendicular to the sleeve and is adapted for engaging the side wall of the corrugations of the pipe and impeding removal of the pipe from the sleeve. The latching members also include side walls 17, shown in FIG. 4, which form the sides of the wedge-shaped latching members and provide reinforcement to the relatively rigid camming surface 15.

For the most effective latching construction, it has been found that the shoulder surface 16 must be located on the sleeve a sufficient distance from the stop wall 14 at the innermost end of the sleeve to permit at least two ribs of the corrugated plastic pipe to fit between the shoulder surface 16 and the stop wall 14. This serves to reinforce the flexible annular sleeve so as to withstand compressive forces applied thereto. This arrangement also serves to insure that the connection between the fitting and the pipe is maintained, even though the pipe may be inadvertently partially removed from the fitting.

Figure 3:
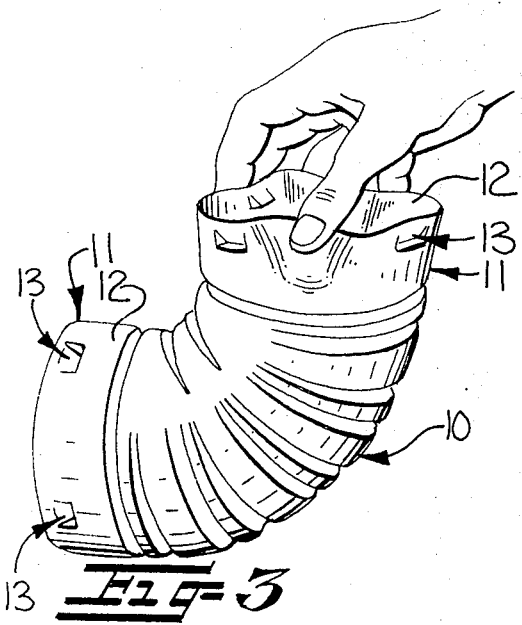
FIG. 3 is a view of a plastic pipe fitting according to the invention illustrating the flexibility of the collar portion of the fitting.

The improved latching connection of the plastic pipe fittings according to this invention, and also the ability of these fittings to accommodate pipes of slightly varying external diameter is provided by the extremely flexible or flimsy nature of the annular sleeve 12. As shown in FIG. 3, the sleeves are so flexible as to be easily deformed by finger pressure. This flexibility of the sleeves permits the latching members on the sleeve to operate independently of one another and move as necessary to receive a length of pipe in the sleeve. The flexibility or flimsiness of the sleeve is attributable in part to the relatively thin-wall thickness of the sleeve 12 as compared to the body portion 10 of the coupling. The wall thickness of the relatively thin-walled flexible annular sleeve is desirably no more than about one-fourth the wall thickness of the body portion. Sleeves 12 are preferably molded so that the wall thickness thereof is within the range of about 0.015 to 0.020 inch. The body portion 10, on the other hand, is preferably within the range of about 0.060 to 0.080 inch. Due to irregularities in the molding process, as for example might occur if the alignment or sealing between the mold halves is imperfect during the molding operation, the wall thickness of the sleeves and the body portion may vary somewhat from these desired ranges. It is desirable however, in order that the sleeves have the required flexibility, that the sleeve has a wall thickness within the range of about 0.015 to 0.020 inch over at least the major area thereof.

The flexibility of the thin-walled annular sleeves is also dependent somewhat on the particular plastic material employed. The plastic material must provide the required flexibility in the thin-walled sleeves without being so flexible as to sacrifice the compressive strength properties necessary in the thicker body portion. It should be understood that the pipe fitting according to the instant invention is not dependent upon the sleeve portion thereof for strength, since the corrugated plastic pipe which is received in the sleeve provides sufficient reinforcement in this area of the fitting, but the body portion 10 must have sufficient strength to resist compressive forces. In addition, the plastic material must retain its flexibility in cold weather and not become brittle. Polyethylene has been found to have suitable properties for these purposes, and in particular it has been found that polyethylene having a density within the range of about 0.954 to 0.957 gm/cm$^3$ maintains the desired properties of flexibility and strength throughout most conditions encountered.

FIG. 5 shows how a pipe fitting according to the invention operates to receive and retain a length of corrugated plastic pipe therein. The end of a corrugated plastic pipe 30 is generally inserted into the sleeve 12 with its axis skewed or cocked somewhat from the axis of the sleeve. This positions one side of pipe 30 fully within sleeve 12 and contacting stop wall 14. This also positions at least one of the latching members 13 (the lower latching member as shown in FIG. 5) with the shoulder surface 16 thereof engaging a rib 31 of the pipe. The pipe and fitting are then manually brought into alignment by moving the two parts together relative to each other as indicated by the arrow. The relatively thin flexible sleeve deforms or bows outwardly, widening the space between opposing latching members and permitting the camming surface 15 of the upper latching member 13 to ride over the ribs of the corrugated plastic pipe as the end of the pipe is fully inserted within the coupling. While sleeve 12 deforms substantially to permit insertion of the pipe, latching members 13 do not deform when a pipe is inserted, even though the latching members are formed from relatively thin-walled plastic material of 0.015 to 0.020 inch thickness, the same as the sleeves. This is due to the relative rigidity of the camming surface 15, 15' which is brought about by the overall shape of the latching members and the reinforcement provided by side walls 17 and shoulder surface 16 of the latching members.

To provide added strength to the pipe fitting, the body portion thereof is corrugated with alternating ribs and valleys. When the pipe fitting is formed as an elbow according to the first embodiment of the invention, the corrugations preferably have a configuration similar to that shown in FIG. 2. At each end of the body portion 10 and adjacent the couplings 11 which are integrally formed with the body portion is a corrugation comprising an annular valley 20 which completely encircles the fitting. This valley 20 has a side wall 14 adjacent thereto which, as noted previously, serves as stop wall to limit the distance a pipe may be inserted in the sleeve. Between the two annular valleys at opposite ends of the body portion are a series of corrugations which extend only partially around the body portion. Preferably the ribs and valleys circumscribe about 240° of the body portion and are convergingly arranged and terminate along the inside curvature of the body portion about 60° on each side of the inside radius of the body portion. The ribs and valleys, as illustrated, are arranged so as to converge towards a common point at the imaginary center of the radius of curvature of the elbow. The ribs in this series of corrugations are alternatingly relatively wide and relatively narrow, while the valleys are of substantially the same width. As seen in FIG. 1, the relatively narrow ribs 21 are substantially the same width as the valleys 22, while the relatively wide ribs 23 are at least twice, and preferably about three times, the width of the valleys 22. The width of the ribs and valleys are tapered along their length, having their widest part along the outside curvature of the elbow and tapering to a smaller width at the ends of the respective ribs and valleys.

The side walls 24 of the corrugations serve to provide compressive strength to the corrugated body member. While this could be provided by corrugated ribs and valleys of substantially the same width throughout the body portion, it has been found that when the corrugated ribs are arranged as described herein with the alternating wide and narrow ribs, the elbow may be constructed with a considerable saving in the amount of plastic material required. The corrugated body according to this invention provides the desired compressive strength in the body portion while reducing the number of side walls, and thereby reducing the amount of plastic material to be consumed in the side walls. Thus, the plastic elbow may be produced with a reduction in cost and weight while maintaining the necessary compressive strength properties. It has also been found that the use of ribs of alternating widths as above described rather than ribs of equal width also improves the material flow of the plastic within the mold during the molding operation, facilitating the molding of a more substantially uniform wall thickness throughout the body portion of the elbow fitting.

According to another embodiment of the invention, as shown in FIGS. 6-9, the plastic pipe fitting may be produced in the form of a tee. The tee fitting has a corrugated body portion 40 with end couplings 41 integrally formed at two opposite ends thereof and with a branch coupling 42 extending outwardly from the side of the body portion. The couplings are similar to the couplings previously described with reference to FIGS. 1–4, having a thin-walled sleeve 43 and a plurality of latching members 44 integral therewith. As with the previous embodiment, the sleeve 43 has a wall thickness of no more than one-fourth the wall thickness of the body portion 40. The sleeve preferably has a wall thickness over at least the major area thereof about 0.015 to 0.020 inch. The couplings 41 and 42 operate to receive and engage a length of corrugated plastic pipe in the manner previously described with reference to FIG. 5.

The walls of the body portion include corrugations of alternating wide, generally flat valleys 45, and wide, relatively flat ribs or plateaus 46. The corrugations extend around the axis of the body portion as shown in FIG. 6 and also circumscribe that area of the body portion shown at 47 which adjoins the branch coupling in the body portion. The width of the valleys 45 and ribs 46 is substantially greater than the height of the side walls 48 connecting the valleys and ribs. Preferably, the width of ribs 45 and valleys 46 is at least three times the height of the side walls 48.

As noted earlier, and as is well known, corrugations in the wall of a tubular body provide compressive strength thereto. While this strength might be provided by corrugations of many configurations, it has been found that when the corrugations in the body portion of the tee fitting are formed having relatively wide valleys and ribs and relatively short side walls as shown herein, rather than deeper and narrower corrugations, the tee fitting may be formed with a considerable reduction in the amount of plastic required, thereby reducing the cost and weight of the fitting. It has been surprisingly found that the desired compressive strength is retained when the described corrugated body structure is employed, despite the reduction in the amount of plastic material employed. It has also been found that this particular corrugated body structure permits faster molding, and consequently increased production since the amount of blowing necessary to shape the fitting during the blow molding operation is reduced.

In the drawings and specifications there have been set forth preferred embodiments of the invention, and although specific terms are employed, they are used in a generic and descriptive sense only and not for purposes of limitation.

That which is claimed is:

1. A plastic pipe fitting characterized in that the end portions thereof have great flexibility for facilitating manual connection of corrugated pipes thereto, even though the corrugated pipes vary somewhat in external diameter, said fitting comprising a corrugated tubular body portion having a wall thickness over at least the major area thereof not exceeding about .080 inch and having couplings integrally formed with said body portion and defining the ends of the fitting to which other corrugated pipes are to be connected, each of said couplings comprising a relatively thin-walled flexible annular sleeve having a wall thickness over at least the major area thereof of no more than about one-fourth that of the body portion and having a substantially uniform inside diameter along the entire axial length of the annular sleeve adapted for receiving therein an end portion of a corrugated plastic pipe to be connected thereto, a plurality of spaced wedge-shaped latching members integrally formed with each flexible annular sleeve and extending radially inwardly around the interior of the sleeve, said latching members having a relatively rigid camming surface thereon and thereby avoiding deformation when a pipe is inserted in said sleeve, said thin-walled annular sleeve permitting ready flexing thereof so as to permit independent movement of the latching members relative to each other for facilitating positioning the end of a corrugated plastic pipe within the sleeve in latching engagement with said latching members.

2. A plastic pipe fitting according to claim 1 wherein said fitting is an elbow fitting and said corrugated tubular body portion comprises corrugations of alternating ribs and valleys wherein alternate ribs are relatively narrow and intervening ribs are relatively wide, said valleys and said relatively narrow ribs being of about the same width and said relatively wide ribs being at least twice the width of said narrow ribs and said valleys.

3. A plastic pipe fitting according to claim 2 wherein said alternating ribs and valleys extend partially around the circumference of said body portion and have tapered opposite ends convergingly arranged and terminating adjacent the inside curvature of the elbow.

4. A plastic pipe fitting according to claim 1 wherein said fitting is a tee fitting and said corrugated tubular body portion comprises relatively wide corrugations of alternating ribs and valleys, the width of said ribs and valleys being at least three times the height of said ribs.

5. A plastic pipe fitting characterized in that the end portions thereof have great flexibility for facilitating manual connection of corrugated pipes thereto, even though the corrugated pipes vary somewhat in external diameter, said fitting being formed from polyethylene having a density within the range of about 0.954 to 0.957 gm/cm$^3$ and comprising a corrugated tubular body portion having a wall thickness over at least the major area thereof within the range of about 0.060 to 0.080 inch and having couplings integrally formed with said body portion and defining the ends of the fitting to which other corrugated pipes are to be connected, each of said couplings comprising a relatively thin-walled flexible annular sleeve having a wall thickness over at least the major area thereof of no more than about one-fourth that of the body portion and having a substantially uniform inside diameter along the entire axial length of the annular sleeve adapted for receiving therein an end portion of a corrugated plastic pipe to be connected thereto, a series of arcuately spaced wedge-shaped latching members to hollow construction positioned axially inwardly from the open end of each flexible sleeve between the midpoint and the open end thereof, said latching members having a relatively rigid camming surface thereon and thereby avoiding deformation when a pipe is inserted in said sleeve, said latching members being of relatively thin-wall construction the same as the sleeve and integrally formed therewith and being arranged in opposing pairs spaced substantially equally apart and projecting radially inwardly around the interior of each sleeve, said thin-walled annular sleeve permitting ready flexing thereof so as to permit independent movement of the latching members relative to each other for facilitating positioning the end of a corrugated plastic pipe within the sleeve in latching engagement with said latching members.

6. A plastic pipe fitting according to claim 5 wherein said series of arcuately spaced latching members comprise four latching members arcuately spaced about 90° apart around the interior of the sleeve.

7. A plastic pipe fitting according to claim 5 wherein said relatively thin-walled flexible annular sleeve has a wall thickness over the major area thereof within the range of about 0.015 to 0.020 inch.

* * * * *

UNITED STATES PATENT OFFICE
CERTIFICATE OF CORRECTION

Patent No. 3,825,288    Dated July 23, 1974

Inventor(s)

It is certified that error appears in the above-identified patent and that said Letters Patent are hereby corrected as shown below:

Column 6, Line 43, change "to" to --of--; same column, Line 45, after "flexible" insert --annular--

Signed and sealed this 8th day of October 1974.

(SEAL)
Attest:

McCOY M. GIBSON JR.
Attesting Officer

C. MARSHALL DANN
Commissioner of Patents